US011741176B2

(12) United States Patent
Agnoli et al.

(10) Patent No.: US 11,741,176 B2
(45) Date of Patent: *Aug. 29, 2023

(54) DETERMINING RELEVANT INFORMATION BASED ON USER INTERACTIONS

(71) Applicant: Apple Inc., Cupertino, CA (US)

(72) Inventors: Giovanni M. Agnoli, San Mateo, CA (US); Joshua C. Weinberg, Sunnyvale, CA (US); Joshua R. Ford, Cupertino, CA (US); Antoine J. Atallah, Bellevue, WA (US); Roozbeh Mahdavian, San Francisco, CA (US); Eric Lance Wilson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 17/027,599

(22) Filed: Sep. 21, 2020

(65) Prior Publication Data

US 2021/0011963 A1    Jan. 14, 2021

Related U.S. Application Data

(63) Continuation of application No. 15/721,717, filed on Sep. 29, 2017, now Pat. No. 10,817,579.

(Continued)

(51) Int. Cl.
*G06F 16/9535* (2019.01)
*G06F 1/16* (2006.01)
(Continued)

(52) U.S. Cl.
CPC .......... *G06F 16/9535* (2019.01); *G04F 10/00* (2013.01); *G04G 13/02* (2013.01);
(Continued)

(58) Field of Classification Search
CPC ...... G04G 21/00; G04G 21/025; G04G 21/06; G04G 99/006; G04G 13/02; G06F 1/163;
(Continued)

(56) References Cited

U.S. PATENT DOCUMENTS 9,471,900 B1 * 10/2016 Boustany ................. G07C 1/10
9,854,084 B2    12/2017 Chang
(Continued)

OTHER PUBLICATIONS

Bohn, "Google Now: behind the predictive future of search," Oct. 29, 2012, downloaded from https://www.theverge.com/2012/10/29/3569684/google-now-android-4-2-knowledge-graph-neural-networks.

(Continued)

*Primary Examiner* — Etienne P Leroux
(74) *Attorney, Agent, or Firm* — BakerHostetler

(57) ABSTRACT

A system for determining relevant information based on user interactions may include a processor configured to receive data and associated relevance information from a data source and a set of signals describing a current environment of a user or historical user behavior information in which the data source being local to a computing device. The processor may be further configured to provide, using a machine learning model, a relevance score for each of multiple data items based at least in part on the received relevance information and the set of signals. The processor may be further configured to sort the data items based on a ranking of each relevance score for each data item. The processor may be further configured to provide, as output, the multiple data items based at least in part on the ranking.

20 Claims, 9 Drawing Sheets

Related U.S. Application Data

(60) Provisional application No. 62/507,201, filed on May 16, 2017.

(51) Int. Cl.

| | | |
|---|---|---|
| *G04G 99/00* | (2010.01) | |
| *G06T 19/00* | (2011.01) | |
| *G06N 20/00* | (2019.01) | |
| *G04G 21/02* | (2010.01) | |
| *G04F 10/00* | (2006.01) | |
| *G04G 21/00* | (2010.01) | |
| *G04G 13/02* | (2006.01) | |
| *G04G 21/08* | (2010.01) | |

(52) U.S. Cl.
CPC ........... *G04G 21/00* (2013.01); *G04G 21/025* (2013.01); *G04G 99/006* (2013.01); *G06F 1/163* (2013.01); *G06N 20/00* (2019.01); *G06T 19/006* (2013.01); *G04G 21/08* (2013.01)

(58) Field of Classification Search
CPC ... G06F 16/9535; G04F 10/00; G06T 19/006; G06N 20/00
See application file for complete search history.

(56) References Cited

U.S. PATENT DOCUMENTS

| | | | |
|---|---|---|---|
| 2014/0101611 A1 | 4/2014 | Lang et al. | |
| 2014/0220945 A1* | 8/2014 | Bookstaff | H04W 4/02 |
| | | | 455/414.1 |
| 2014/0275824 A1* | 9/2014 | Couse | G16H 40/60 |
| | | | 600/301 |
| 2015/0127365 A1* | 5/2015 | Rizvi | G06V 40/28 |
| | | | 705/2 |
| 2015/0149287 A1 | 5/2015 | Brown | |
| 2016/0189049 A1 | 6/2016 | Silvestri et al. | |
| 2016/0248863 A1* | 8/2016 | Tseng | G06Q 30/0242 |
| 2016/0275139 A1 | 9/2016 | Gandhe et al. | |
| 2016/0299977 A1 | 10/2016 | Hreha | |
| 2016/0379476 A1* | 12/2016 | Sella | A61B 5/746 |
| | | | 340/539.19 |
| 2017/0010664 A1* | 1/2017 | Tanaka | H04L 63/0869 |
| 2017/0255831 A1* | 9/2017 | Bernal | H04L 67/01 |
| 2017/0277367 A1* | 9/2017 | Pahud | G06F 3/017 |
| 2018/0107943 A1* | 4/2018 | White | G06Q 10/1093 |
| 2018/0129888 A1 | 5/2018 | Schubert | |
| 2018/0139553 A1 | 5/2018 | Chen | |
| 2018/0144154 A1* | 5/2018 | Shacham | H04L 63/104 |
| 2018/0157760 A1 | 6/2018 | Garg | |
| 2018/0211178 A1 | 7/2018 | Millius | |
| 2018/0224871 A1* | 8/2018 | Sahu | G06F 1/3231 |
| 2018/0338709 A1* | 11/2018 | Krans | A61B 5/1118 |

OTHER PUBLICATIONS

Charara, "How machine learning will take wearable data to the next level," Jun. 26, 2015, downloaded from https://www.wareable.com/wearable-tech/machine-learning-wearable-data-sensors-2015.

Dignan, "How Google's Awareness API applies to digital transformation efforts, but note best practices," Feb. 7, 2012, downloaded from https://www.zdnet.com/article/how-googles-awareness-api-applies-to-digital-transformation-efforts-but-note-best-practices/.

Wortham, "Will Google's Personal Assistant Be Creepy or Cool?" Jun. 28, 2012, downloaded from https://bits.blogs.nytimes.com/2012/06/28/will-googles-personal-assistant-be-creepy-or-cool/.

* cited by examiner

DETERMINING RELEVANT INFORMATION BASED ON USER INTERACTIONS

CROSS-REFERENCE TO RELATED APPLICATIONS

The present application is a continuation of U.S. patent application Ser. No. 15/721,717, "DETERMINING RELEVANT INFORMATION BASED ON USER INTERACTIONS," filed Sep. 29, 2017, which claims the benefit of U.S. Provisional Patent Application Ser. No. 62/507,201, entitled "DETERMINING RELEVANT INFORMATION BASED ON USER INTERACTIONS," filed May 16, 2017, each of which is hereby incorporated herein by reference in its entirety and made part of the present U.S. Utility Patent Application for all purposes.

TECHNICAL FIELD

The present description relates generally to determining relevant information based on user interactions, including determining, locally at a use device, relevant information, such as based on user interactions at the user device.

BACKGROUND

Mobile electronic devices (e.g., watch or smartphone) are popular and are often carried by users while performing daily, and/or recurring, tasks. For example, a user of a mobile electronic device may interact with the device over the day by using mobile applications that are installed locally on the device. The mobile electronic device, however, may have a small screen that limits the amount of information that can be provided to the user at any given time. Thus, if the information provided to a user at any given time is not relevant to the user, the user may need to further interact with the mobile electronic device to find relevant information and/or applications.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject system provides an architecture that enables locally determining relevant information at a user device (e.g., without facilitation from a server) using a locally stored machine learning (ML) model that provides relevance scoring and/or ranking of data provided by local data sources. In an example, the relevance scoring is based on input signals that describe the user's current environment and/or historical user behavior information. In one or more implementations, the subject system may be implemented by a wearable electronic device (e.g., a smart watch), but it is appreciated that the subject technology can be implemented on other types of devices and utilize other types of output formats (e.g. graphical, auditory, etc.).

Figure 1:
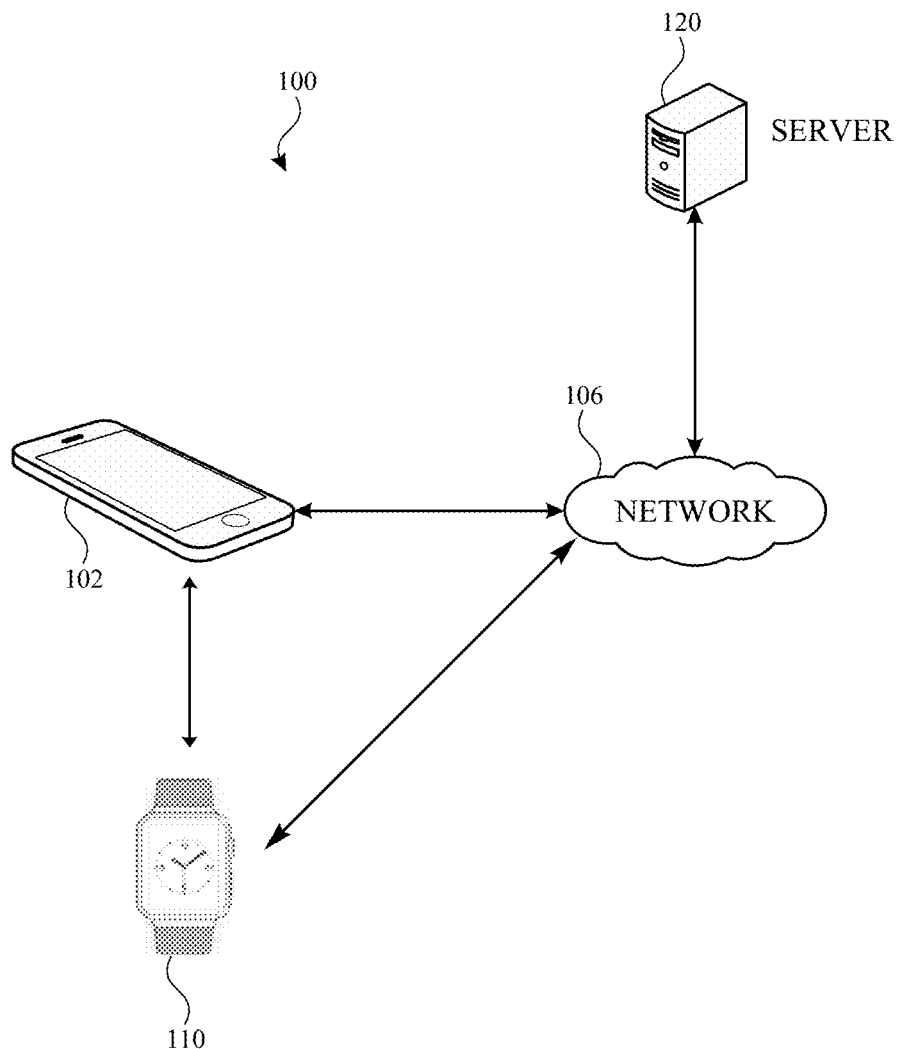
FIG. 1 illustrates an example network environment for providing relevant information based on user interactions in accordance with one or more implementations.

FIG. 1 illustrates an example network environment 100 for providing relevant data to an electronic device in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 102, a wearable electronic device 110 and a server 120. The network 106 may communicatively (directly or indirectly) couple, for example, any two or more of the electronic device 102, the wearable electronic device 110, and/or the server 120. In one or more implementations, the network 106 may be an interconnected network of devices that may include, or may be communicatively coupled to, the Internet. For explanatory purposes, the network environment 100 is illustrated in FIG. 1 as including an electronic device 102, a wearable electronic device 110, and a server 120; however, the network environment 100 may include any number of electronic devices and any number of servers.

The electronic device 102 may be, for example, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a mobile device. The electronic device 102 may be, and/or may include all or part of, the electronic system discussed below with respect to FIG. 9. The electronic device 102 may communicate with the wearable electronic device 110.

The wearable electronic device 110 may be, for example, a wearable device configured to be worn on a user's arm that includes, for example, one or more wireless interfaces, such as WLAN radios, cellular radios, Bluetooth radios, Zigbee radios, near field communication (NFC) radios, and/or other wireless radios. The wearable electronic device 110 may be, and/or may include all or part of the electronic device discussed below with respect to FIG. 8.

Although the wearable electronic device 110 is illustrated as being capable of communicating with another device or server using the network 106, in one or more implementations described herein, the wearable electronic device 110 performs operations locally on the device itself to provide relevant data to a user (e.g., without communicating over the network 106 and/or the server 120).

Figure 2:
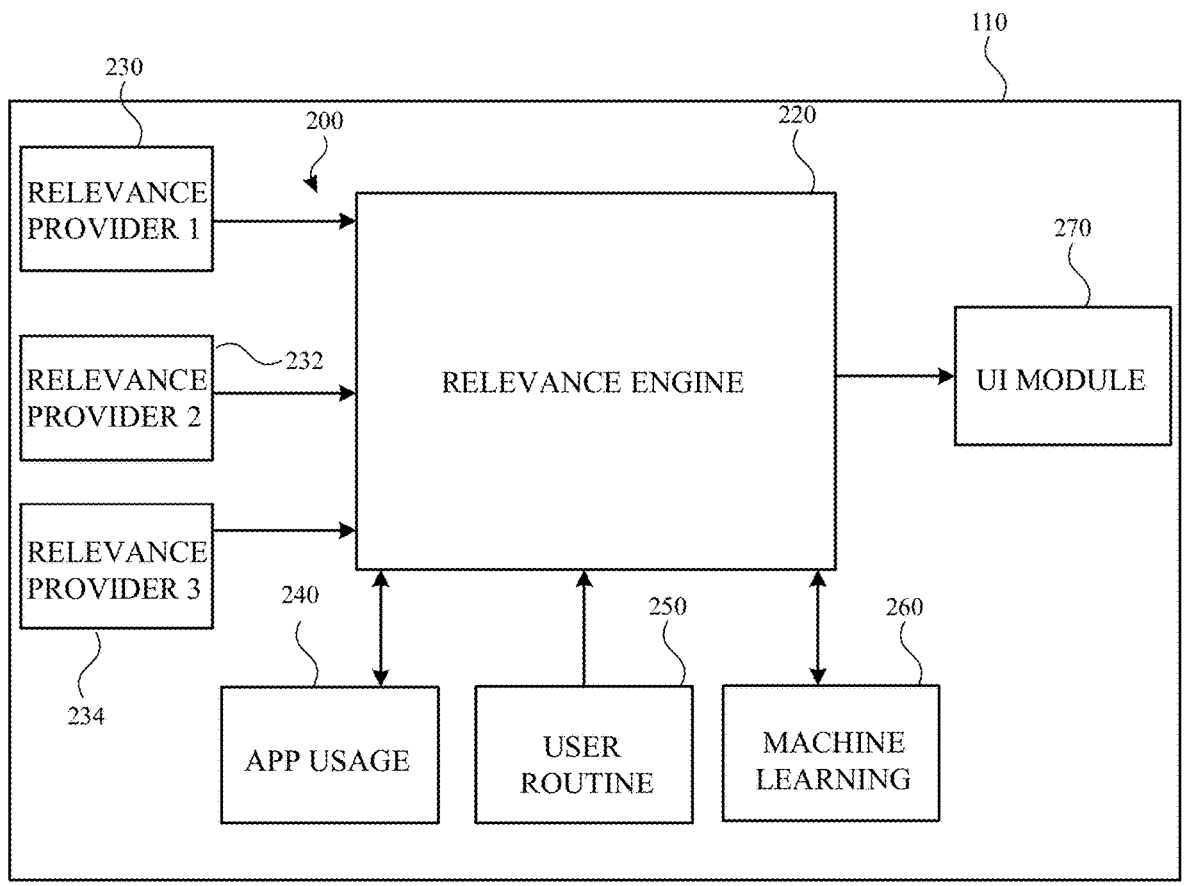
FIG. 2 illustrates an example diagram of an architecture of a system for providing relevant information based on user interactions in accordance with one or more implementations.

FIG. 2 illustrates an example architecture 200 for determining relevant data at a user's device in accordance with one or more implementations. For explanatory purposes, the architecture 200 is described as being implemented by the wearable electronic device 110 of FIG. 1, such as by a processor and/or memory of the wearable electronic device 110; however, the architecture 200 may be implemented by any other electronic device, such as the electronic device 102. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The architecture 200 includes a relevance engine 220 that receives, as input, information from data sources to determine a relevance score for data from such data sources as described in further detail below. The data sources may be local to the wearable electronic device 110. Examples of a data source include an application, service, widget, or program that is stored locally and/or running on the wearable electronic device 110. A data source maintains a list of data items that are associated with the data source. An example data item is described further below in FIG. 5. The data item may include information about relevance providers for the data item and an identifier of the data item (e.g., for assigning a relevance metric back to the appropriate data item). Examples of relevance graphs for relevance providers are further discussed in FIG. 6 as described below.

Information from a data item may be used to form a graphical UI object or element(s) that is displayed by a user interface (UI) module 270. The data item may be associated with relevance information that includes and/or indicates a relevance metric for the data item. A relevance metric may be a numerical score associated with the data item indicating a measure of relevance of the data item to a user of the wearable electronic device 110. The measure of relevance of the data item can indicate how useful the information provided by the data item would be to the user with respect to the current time and/or location of the user, and/or with respect to other current environmental variables. In one or more implementations, the relevance engine 220 may utilize a function corresponding to a relevance graph (which is described in more detail in FIG. 6) to determine a relevance metric. Using the relevance metric and/or other signals that may boost or lower the relevance metric, the relevance engine 220 may determine a final relevance score for assigning to a given data item. In an example, the final relevance score may be a linear combination of the relevance metric and/or other signals.

In one or more implementations, a given relevance provider may provide a relevance score directly to the relevance engine 220 for using to rank a particular data item. The relevance engine 220 may utilize the received relevance score as the final relevance score, and/or the relevance engine 220 may boost or lower the relevance score based on one or more other signals. In one or more implementations, the relevance provider may utilize a machine learning model to determine the relevance score that is provided to the relevance engine 220. The relevance engine 220 may utilize another machine learning model to weight, boost, or bias the received relevance score.

The relevance engine 220, using the respective relevance scores, may rank multiple data items in accordance with an order from the highest relevance score to the lowest relevance score (or some other appropriate order), and the UI module 270 may render one or more UI graphical elements corresponding to the data items for display by the wearable electronic device 110 based on the order of relevance provided by the relevance engine 220. An example process with respect to ranking data items is described in more detail in FIG. 3 below. An example UI that displays UI graphical features associated with different data items is described by reference to FIG. 4.

In the example of FIG. 2, relevance providers 230, 232, and 234 provide information to the relevance engine 220. Each of the relevance providers 230, 232, and 234 may be associated with a different data item (e.g., corresponding to a different application on the wearable electronic device 110). Although three relevance providers are shown, it is appreciated that any number of data items may provide information to the relevance engine 220 at a given time and still be within the scope of the subject technology. Information from these data items are received by the relevance engine 220. A description of information from an example data item is described further below in FIG. 5. As discussed above, the relevance engine may receive a relevance score directly from a relevance provider in an implementation for ranking a particular data item.

As further illustrated, the wearable electronic device 110 provides an application usage module 240, a user routine module 250, and a machine learning module 260. The application usage module 240 provides signals regarding usage information of applications based on historical information regarding the usage of applications by the user and/or the current or recent user activity. In an example, the application usage module 240 provides a score between 0 to 1 that indicates the likelihood that the user will launch an application. The user routine module 250 provides signals regarding information corresponding to a location where the user will likely be based on prior user locations and/or scheduling information (e.g., calendar events, meetings, etc.). The user routine module 250 may also provide wrist detection information for determining a start and an end of the user's day.

Figure 7:
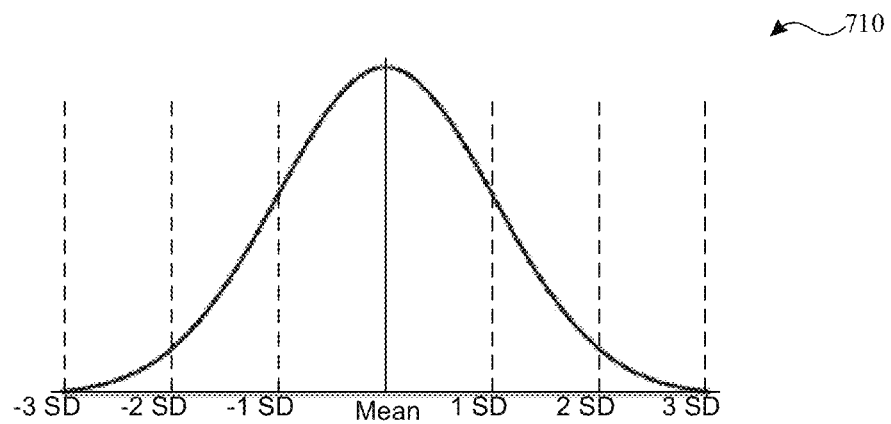
FIG. 7 illustrates an example Gaussian curve based on an affinity value (e.g., mean) and confidence value (e.g., variance) and the example Gaussian curve being shifted as a result of subtracting one standard deviation from the Gaussian curve in accordance with one or more implementations.
Figure 7:
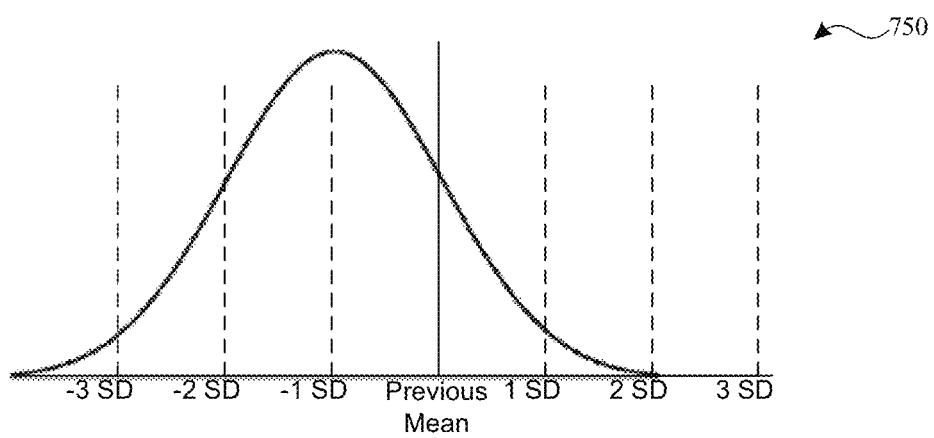

The machine learning module 260 provides a machine learning (ML) model for adjusting relevance metrics based on the behavior of the user of the wearable electronic device 110 over time which is discussed further below with respect to FIG. 7. Thus, it is appreciated that the machine learning module 260 provides a ML model, using local information, for the user of the wearable electronic device 110 (e.g., a per user ML model instead of a model for a general population). As new signals are received, the relevance engine 220 may feed the machine learning module 260 these new signals to adjust a set of constants (e.g., weights) assigned to the new signals (described further in FIG. 7). In another example, the machine learning module 260 may also adjust a value of a relevance metric itself (e.g., boosting or biasing). The adjusted constants and/or relevance metric(s) are then passed back to the relevance engine 220 for ranking the data item(s).

Figure 3:
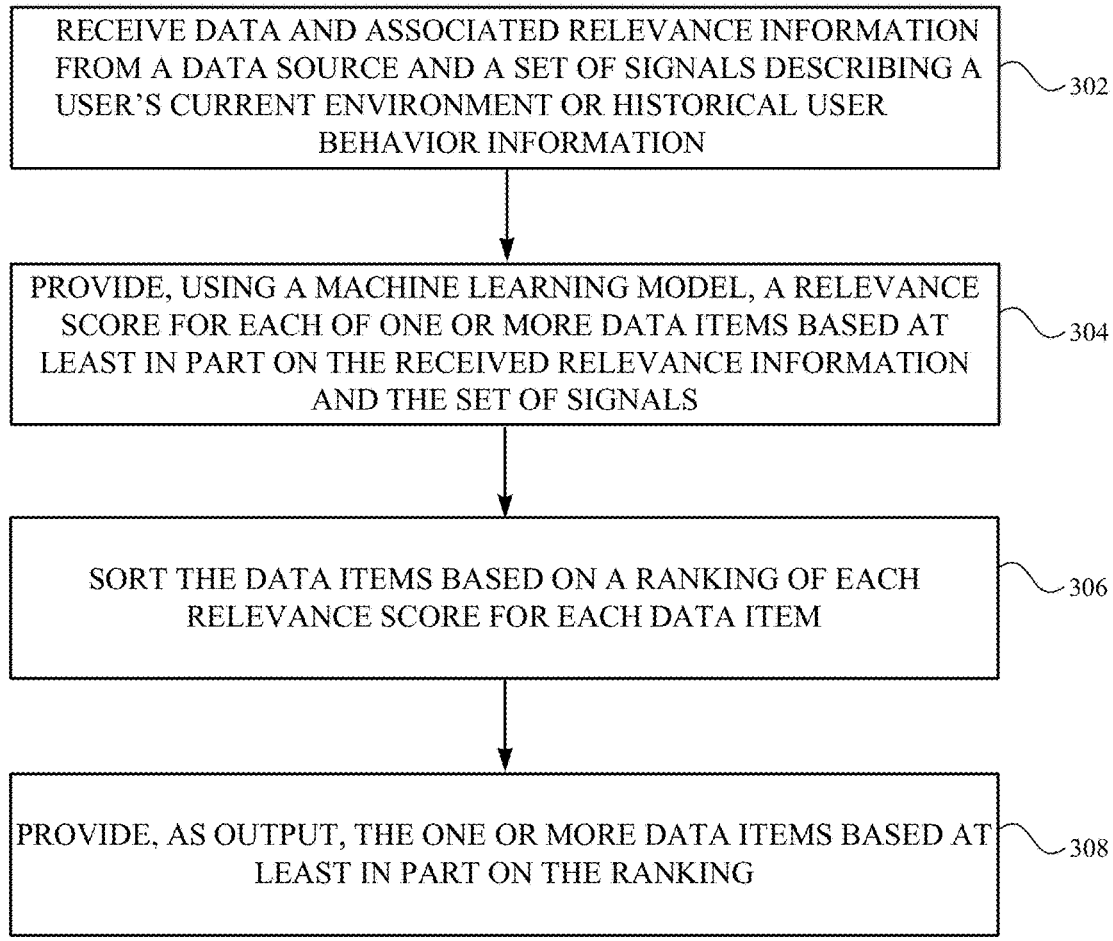
FIG. 3 illustrates a flow diagram of an example process for identifying relevant data items in accordance with one or more implementations.

FIG. 3 illustrates a flow diagram of an example process 300 for ranking data items in accordance with one or more implementations. For explanatory purposes, the process 300 is primarily described herein with reference to the wearable electronic device 110 of FIG. 1. However, the process 300 is not limited to the wearable electronic device 110 of FIG. 1, and one or more blocks (or operations) of the process 300 may be performed by one or more other components of the electronic device 102 and/or by other suitable devices. Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

As illustrated in FIG. 3, the wearable electronic device 110 receives data and associated relevance information from a data source and a set of signals describing a user's current environment or historical user behavior information (302). In one or more implementations, the data source is local to the wearable electronic device 110 such that the wearable electronic device 110 does not need to communicate over the network 106 to receive information from the data source. Some non-limiting examples of data sources local to the wearable electronic device 110 may include applications, widgets, or programs, etc., such as the following: calendar, reminders, alarms, timers, stopwatch, weather, stocks, sunrise, sunset, activity, breathe, fitness, heartrate, commute, news, Internet of things (IoT), home automation, and/or digital wallet.

Some non-limiting examples of signals may include the following information that describes the user's current environment and/or that describes historical or likely user behavior: current location of user, current time of day, recent user activity (e.g., what was the user doing), personal digital assistant information, historical topic information requested by user (e.g., stocks, weather, etc.), dwell time (e.g., how long a user hovers over a data item in a watch implementation), scrolling activity (e.g., how far does the user scroll down the list of elements), tap through or not activity (e.g., does a user tap on the element), a likelihood that user will launch an application (e.g., based on information such as prior user activity and a probability calculation), and/or when the user puts on or takes off the watch or device (e.g., to determine the beginning and end of a user's typical).

The wearable electronic device 110 provides, using a machine learning (ML) model, a relevance score for each of one or more data items based at least in part on the received relevance information (e.g., from relevance providers 230, 232, and 234) and the set of signals (304). The received relevance information may include information from a relevance provider that the relevance engine 220 discussed in FIG. 2 can utilize to provide a relevance score (discussed in more detail in FIG. 6). In an example, the relevance engine 220 may provide the machine learning model the relevance score so that the ML model can modify or adjust the relevance score and provide a final relevance score. Alternatively or conjunctively, the ML model may receive information from one or more data sources and/or signals (some of which may not be ML based) in order to determine a relevance score and then subsequently provide this relevance score to the relevance engine 220. Further, a set of constants, which are part of a linear combination of different signals that form a final relevance score, may be provided and are adjusted by the ML model (described further by reference to FIG. 7) where boosting and biasing may occur based on factors and computations.

Figure 6:
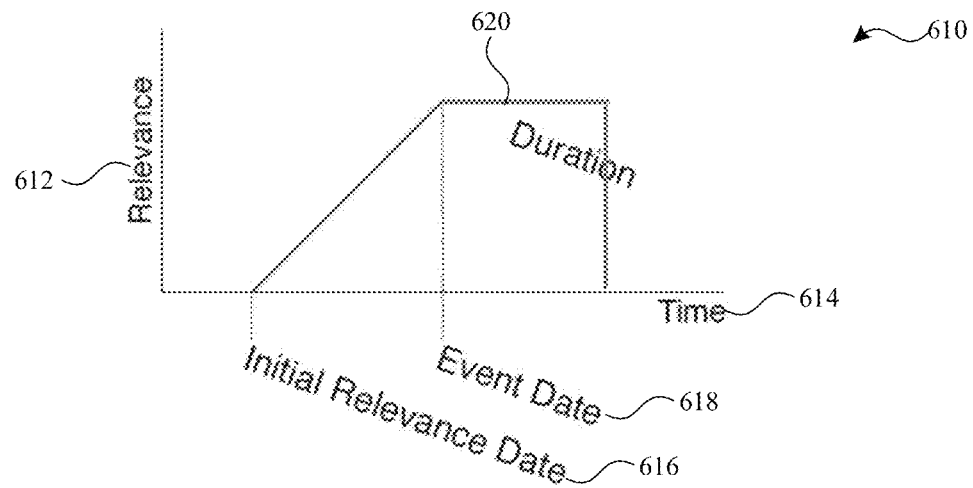
FIG. 6 illustrates an example relevance graphs for relevance providers in accordance with one or more implementations.
Figure 6:
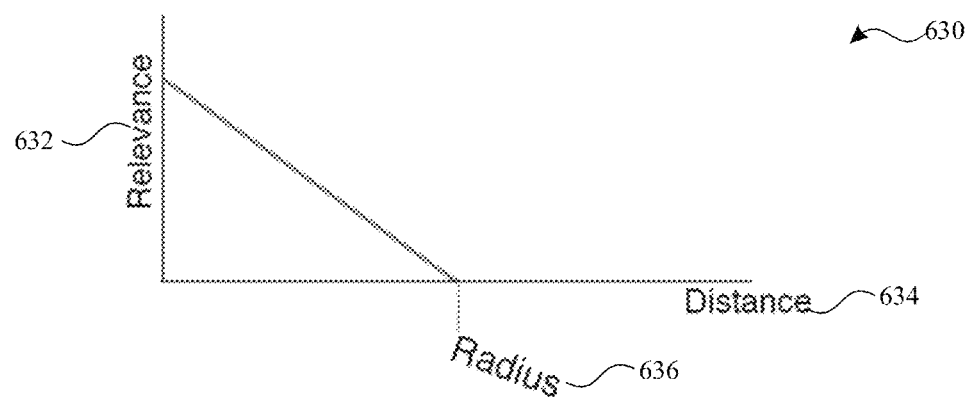
Figure 6:
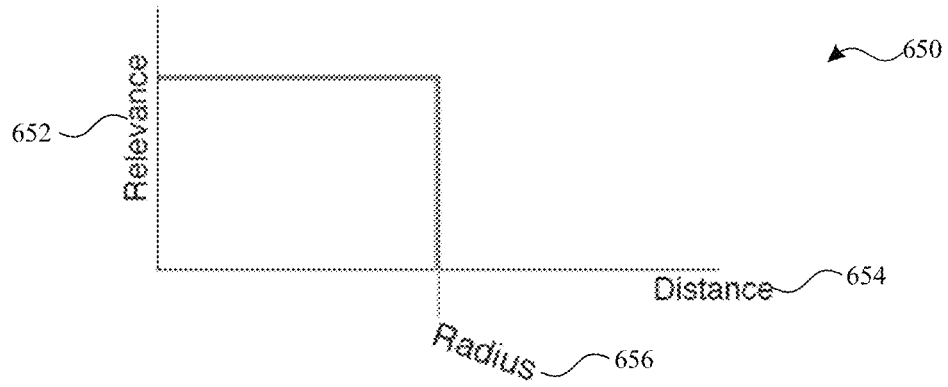

In an example, a final relevance score for a particular data item, based on signals corresponding to time and location (which have associated relevance metrics provided by associated relevance providers discussed in FIG. 6), may be represented as a sum of a linear combination of a(time)+b(location) where a & b are constants that are provided by the wearable electronic device 110. The a and b constants may be adjusted by the ML model and then the adjusted a and b constants are provided to the relevance engine 220 for recalculating the final relevance score using the aforementioned linear combination of a(time)+b(location). Using the recalculated final relevance score, the relevance engine 220 may then rank the data item with other data items based on their associated relevance scores.

Other signals that could affect the relevance score include an order that user launches one or more apps on the device and an importance of a data item based on other factors (e.g., important person in a calendar invite). In a touch interface implementation, the wearable electronic device 110 tracks prior activity and if the user shows a history of not tapping or interacting with a data item, that data item can be scored lower. Further, the wearable electronic device 110 may also determine (e.g., using a sensor detecting motion) when the user is looking at the screen of the wearable electronic device 110 but does not interact with a data item, and can decrease the score for the data item. Similarly, when the wearable electronic device detects that the user is looking at the screen and does interact with a data item, the score for the data item may be increased. Scores get dynamically updated/recalculated as new signals are received. These new signals may be fed into the ML model to adjust the final relevance score as described above. The ML model, in an example, gets retrained by the wearable electronic device 110 at night (e.g. while device is charging), and/or at any other time.

The wearable electronic device 110 sorts/ranks the data items based on the relevance score for each data item (306). For example, sorting can be by score and chronology (time). In another example, other sorting schemes (e.g., from least relevant to most (reverse relevance ordering)) may be used. The wearable electronic device 110 provides, as output, the one or more data items based at least in part on the ranking (308). In an example, the output is provided to the UI module 270 for rendering the UI to the user and/or output for display on a particular device (described in more detail in FIG. 4 below). In another example, the output can be in an auditory format, (e.g. personal digital assistant). In yet another example, the output can be in a text format (e.g., messaging application).

In one or more implementations, the wearable electronic device 110 is configured to provide a multi-dimensional ranking system for data items in different environments and/or in different output formats. For example, the relevance engine 220 in FIG. 2 of the wearable electronic device 110 (or any appropriate electronic device) can utilize techniques for ranking data items in a virtual reality or augmented reality environment and also for determining placement or positioning of the ranked data items in these types of environments. In another example, the relevance engine 220 ranks data items and provides the data items in an auditory format (e.g., voice). Generally, the relevance engine 220 may be configured to determine placement or positioning of the ranked data items irrespective of the output format and/or environment, where appropriate.

Figure 4:
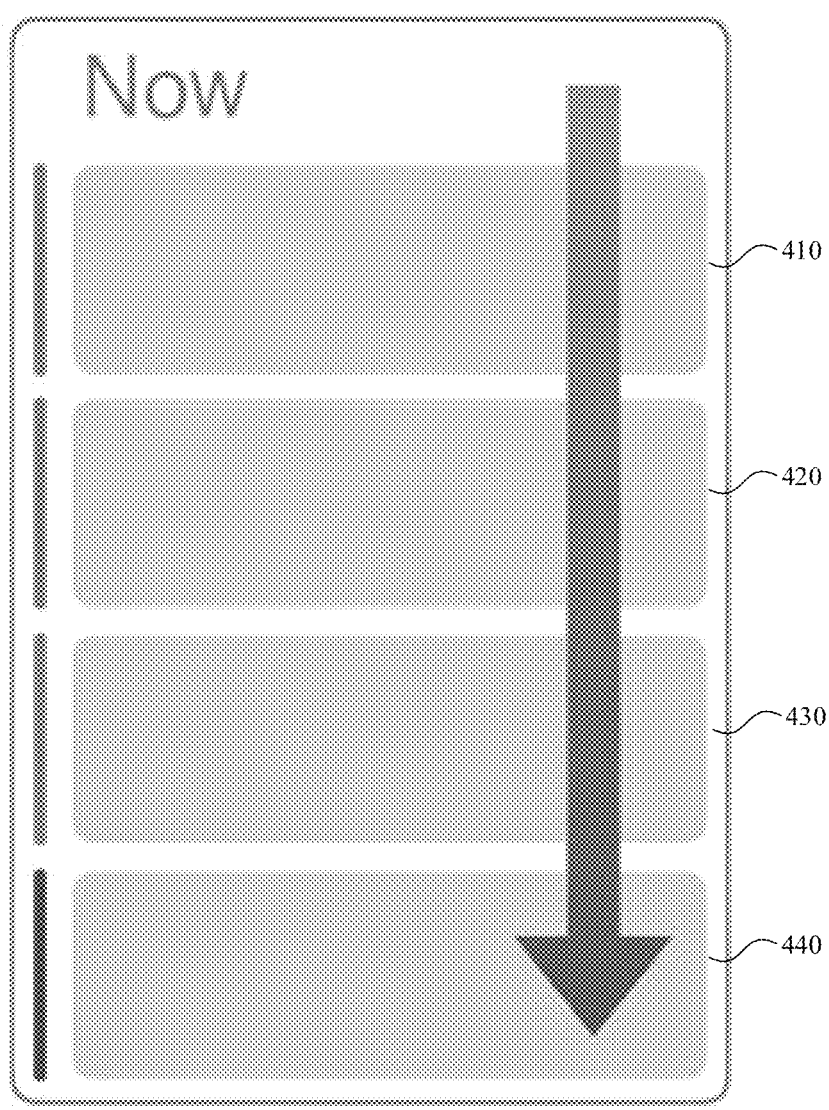
FIG. 4 illustrates an example graphical user interface displaying relevant data items in accordance with one or more implementations.

FIG. 4 illustrates an example graphical user interface for displaying ranked data items in accordance with one or more implementations. The UI module 270 of the wearable electronic device 110 may provide for display a user interface 400 for presenting graphical elements 410, 420, 430, and 440. In one or more implementations, the graphical elements 410, 420, 430, 440 may each be a respective watch face tile displayed by the wearable electronic device 110 based on information from different items. Each different data item may have a different relevance score, and the relevance scores are ranked by the relevance engine 220. In this example, the graphical elements 410, 420, 430, and 440 are sorted from highest relevance score to lowest relevance score. However, it is appreciated that the graphical elements 410, 420, 430, and 440 may be sorted in a different order(s) than the example shown in FIG. 4. Further, the UI module 270 may concurrently display any number of the ranked data items (or subset thereof) even though, for purposes of explanation, four data items are shown in FIG. 4.

Figure 5:
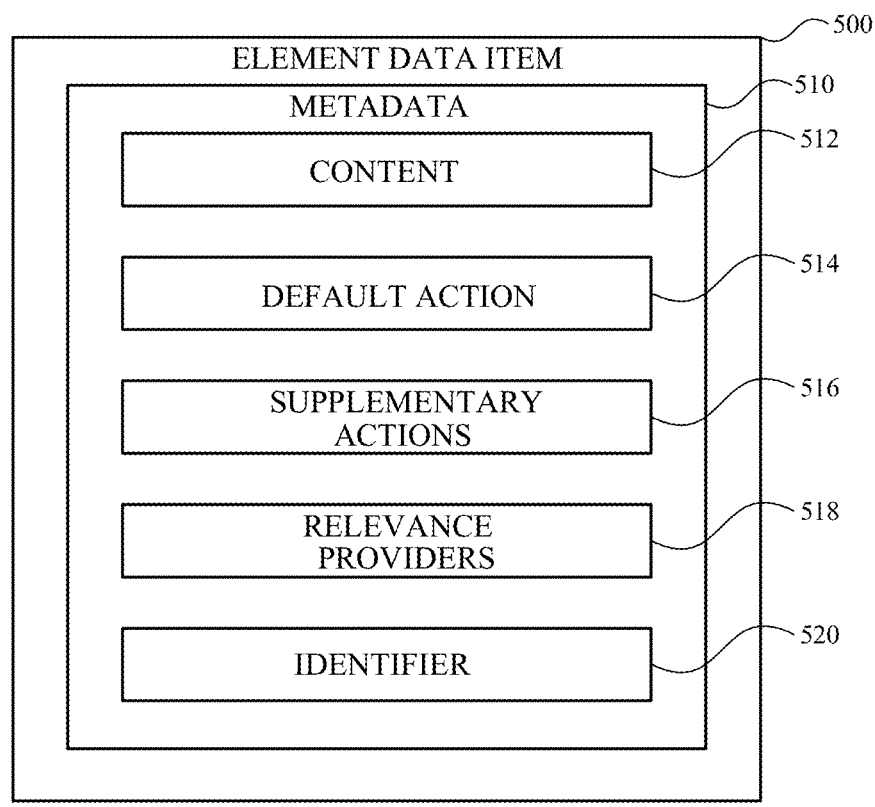
FIG. 5 illustrates an example data item in accordance with one or more implementations.

FIG. 5 illustrates an example data item 500 in a system for determining relevant data at a user's device in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. As mentioned before, a data source may provide a given data item and may generate the associated metadata for the data item. The data item 500 in FIG. 5 describes example metadata included in the data item. The metadata 500 provides the architecture 200 and the relevance engine 220 therein with information for receiving relevance information from relevance providers and information for rendering UI graphical elements to the UI module 270.

The data item 500 includes metadata 510. The metadata 510 includes information for content 512, default action 514, supplementary actions 516, relevance providers 518, and identifier 520. The content 512 includes information which is displayed to the user (e.g., by the UI module 270). For example, the content 512 includes header image and text. In an example, the header image and text can indicate the time of an event. The content 512 further includes a description of the data item 500. The content 512 further includes UI and style characteristics such as a color that is used for various UI graphical elements when the information in the content 512 is rendered by the UI module 270. An example UI that displays UI graphical features associated with different data items is described by reference to FIG. 4 as discussed above.

The metadata 510 further includes information for a default action 514 which is performed when the user interacts with the data item as rendered by the UI module 270. In one example, the default action 514 includes information such as an action to launch a particular application or a link that accesses data associated with an application or widget (e.g., calendar event). Other types of default actions may be provided and still be within the scope of the subject technology.

The metadata 510 also includes information for supplementary actions 516 corresponding to information to provide additional options to the user. Supplementary actions may include additional content to display in the UI for the data item as rendered by the UI module 270, and can vary depending on the data item and its associated application or widget. The metadata 510 additionally includes information for relevance providers 518. Based on the information for relevance providers, the relevance engine 220 can receive relevance information to determine a relevance metric for the data item 500. Examples of information provided by relevance providers are discussed in more detail below in FIG. 6.

FIG. 6 illustrates an example relevance graphs for relevance providers in accordance with one or more implementations. The example of FIG. 6 illustrates three example relevance graphs 610, 630, and 650 for determining, in part, a relevance metric to assign a particular data item. In one or more implementations, the relevance engine 220 described by reference to FIG. 2 utilizes one or more of the relevance graphs 610, 630, and 650 to determine, in part, a relevance metric to assign a particular data item. In another example, a relevance metric may be determined (e.g., by an application or data source that is providing relevance information), using one or more of the relevance graphs 610, 630, and 650, before being received by the relevance engine 220. Each of the relevance graphs includes a representation of a function of a relevance metric with respect to an x value. The x value can correspond to a value of distance (e.g., indicating a location) or a value of time. The example functions represented in each of the relevance graphs may be implemented by associated relevance providers for providing relevance metrics to the relevance engine 220. In an example, a given relevance provider is implemented by an associated local data source (examples of which have been discussed above).

As shown, the relevance graph 610 corresponds to a relevance provider for a date relevance of a given data item. The date relevance may correspond to a relevance metric based on how temporarily close the current time is to a time of a specific event. The x-axis represents a value of time 614 and the y-axis represents a relevance value or score 612 from 0-1. At an initial relevance date 616, a relevance value is initially zero and increases in value at a constant rate until reaching an event date 618 corresponding to a time associated with when an event is scheduled to occur. For a duration 620 of the event, a relevance value stays at the same relevance value. After the end of the event, the relevance value may drop to a value of zero. A signal corresponding to a current time of the wearable electronic device 110 may be provided to the relevance provider which then determines the relevance metric using the relevance graph 610. The relevance metric can then be provided to the relevance engine 220 for ranking the data item.

As shown, the relevance graph 630 corresponds to a relevance provider for location relevance of a given data item. The location relevance may correspond to a relevance metric based on how geographically close the user is to a specific location (e.g., home, work, a location of a meeting or calendar event, etc.). The x-axis represents a value of distance 634 and the y-axis represents a relevance value or score 632 from 0-1. At a zero distance from an event (e.g., a set of global positioning system (GPS) coordinates corresponding to the location of the event), a relevance value is initially at a value of 1 and decreases in value at a constant rate until reaching a radius 636 corresponding to a predetermined distance away from the location corresponding to the zero distance from the event. A distance beyond the radius 636 results in a relevance value of zero. A signal corresponding to a current location of the wearable electronic device 110 may be provided to the relevance provider which then determines the relevance metric using the relevance graph 630. The relevance metric can then be provided to the relevance engine 220 for ranking the data item.

As shown, the relevance graph 650 corresponds to a relevance provider for geofence relevance of a given data item. The geofence relevance may correspond to a relevance metric based on how geographically close the user is to a given geofence area. A geofence area may refer to a virtual geographic boundary, defined by, for example, GPS coordinates, that enables the architecture 200 to provide a response when the wearable electronic device 110 enters or leaves a particular geographic area corresponding to the geofence area. The x-axis represents a value of distance 654 and the y-axis represents a relevance value or score 652 from 0-1.

At a zero distance from the geofence area (e.g., a set of GPS coordinates representing the center of the geofence area), a relevance value is initially at a value of 1 and remains the same value until reaching a radius 656 corresponding to a predetermined distance away from the zero distance location of the geofence area. A distance beyond the radius 636 results in a relevance value of zero as the user is now outside of the geofence area. A signal corresponding to a current location of the wearable electronic device 110 may be provided to the relevance provider which then determines, based on whether the current location is within the geofence area, the relevance metric by using the relevance graph 650. The relevance metric can then be provided to the relevance engine 220 for ranking the data item.

Other types of relevance providers may be contemplated and be within the scope of the subject technology. For example, at least one implementation provides a daily routine relevance provider that may provide relevance metrics for data items which are considered relevant during different time periods in the user's day. For example, a user's day may be divided into three different time periods: morning, evening, and downtime. The morning period may correspond to a period of time after the user wakes up (e.g., an alarm being triggered by the wearable electronic device 110), arrives at work until midday. The evening period may correspond to a period of time after the morning period until the user removes the electronic device. The downtime period may correspond to a period of time when the user does not have scheduled activities, such as during the evening, or during the weekend.

As described above with respect to FIG. 2, the machine learning module 260 may utilize a machine learning (ML) model for adjusting relevance metrics based on the user's activity over time. The machine learning module 260 runs locally on the wearable electronic device 110 and generates a ML model that is provided locally on the electronic device (e.g., not sent to/received from a server or into the cloud).

In instances where the wearable electronic device 110 is a portable or mobile device (e.g., one that runs on a battery), resources (e.g., processing, storage, memory, power, etc.) may be limited on such a device. To deal with the limited resources that may be present on the wearable electronic device 110, the machine learning module 260 provided by implementations described herein utilize different techniques for using less resources while also more quickly producing a model that matches (or predicts) the user's behavior without a requirement for collecting information on user behavior over a prolonged period of time (e.g., weeks or months). Moreover, the wearable electronic device 110 does not have access to information regarding user behavior for a given population size (e.g., multiple different users with similar demographics as the user of the wearable electronic device 110) and instead relies upon information pertaining to a single user of the wearable electronic device 110.

Initially, the machine learning module 260 has no information regarding the user's behavior. To assist in generating the ML model for the user, the machine learning module 260 extracts different properties from each data item provided by a data source (e.g., widget or application, etc.) locally on the wearable electronic device 110. These properties may include metadata as provided by the data item 500 and/or other information such as a category associated with the data source, location information, and time information (e.g., calendar event, alarm, etc.). The properties may be dependent on the type of data item as different types of data items include different properties. Examples of such properties may include a name of an artist, a location of weather, name of a person that the user is meeting, a time of a calendar event, etc. Other types of properties are contemplated and within the scope of the subject technology.

The machine learning module 260 then determines context information with respect to a current time and a location of the user. For example, the context information may be based on a time with respect to a date, a time to a period of day (e.g., time to sunrise, time to sunset), or a time until an appointment or calendar event. The context information may be based on a location corresponding to a current location of the user, a location with respect to an event (e.g., how far the user is to the event), or a location with respect to a geofence area (e.g., is the user within or close to a geofence area) as discussed above.

For a given data item, the machine learning module 260 determines, using the aforementioned context information and properties of the data item, a mean and a variance. The mean corresponds to value indicating an affinity (e.g., relevance) of the data item to the user. The variance indicates a confidence value of the affinity to the user. In an example, the confidence value can indicate a frequency (e.g., how often) that the data item is provided for display by the UI module 270. The confidence value therefore is a function of how often a particular data item is presented to the user.

In an example, the machine learning module 260, when initially determining the ML model for the user, determines a positive or negative affinity corresponding to data items. A positive affinity may correspond to user behavior such as if the user taps or clicks on a UI graphical element associated with the data item. A negative affinity may correspond to user behavior such as when the user scrolls by, without any additional interaction, the UI graphical element associated with the data item.

The machine learning module 260 may generate a respective Gaussian curve using the affinity value and variance corresponding to the data item, which is based on an assumption that a given affinity value is normally distributed. FIG. 7 illustrates an example Gaussian curve 710 based on an affinity value (e.g., mean) and confidence value (e.g., variance) determined by the machine learning module 260.

The machine learning module 260 subtracts one (1) standard deviation value from the Gaussian curve, which shifts the Gaussian curve to the left. FIG. 7 illustrates an example Gaussian curve 750 being shifted as a result of subtracting one standard deviation from the Gaussian curve 710. By doing so, the machine learning module 260 penalizes a Gaussian curve that has lower confidence and boosts a Gaussian curve that has higher confidence. This enables the ML model to converge a Gaussian curve to a position that represents predicted user behavior much quicker than a model that requires more training data from a general population.

To better adapt to changing user behavior over time, the machine learning module 260 reduces the value of the standard deviation that is subtracted (e.g., decreasing the amount of shifting the Gaussian curve left) over time, and increases the value of the variance over time (e.g., making the Gaussian curve wider). Reducing the value of the standard deviation and increasing the value of the variance may occur at arbitrary points in times or after a specific number of iterations.

Figure 8:
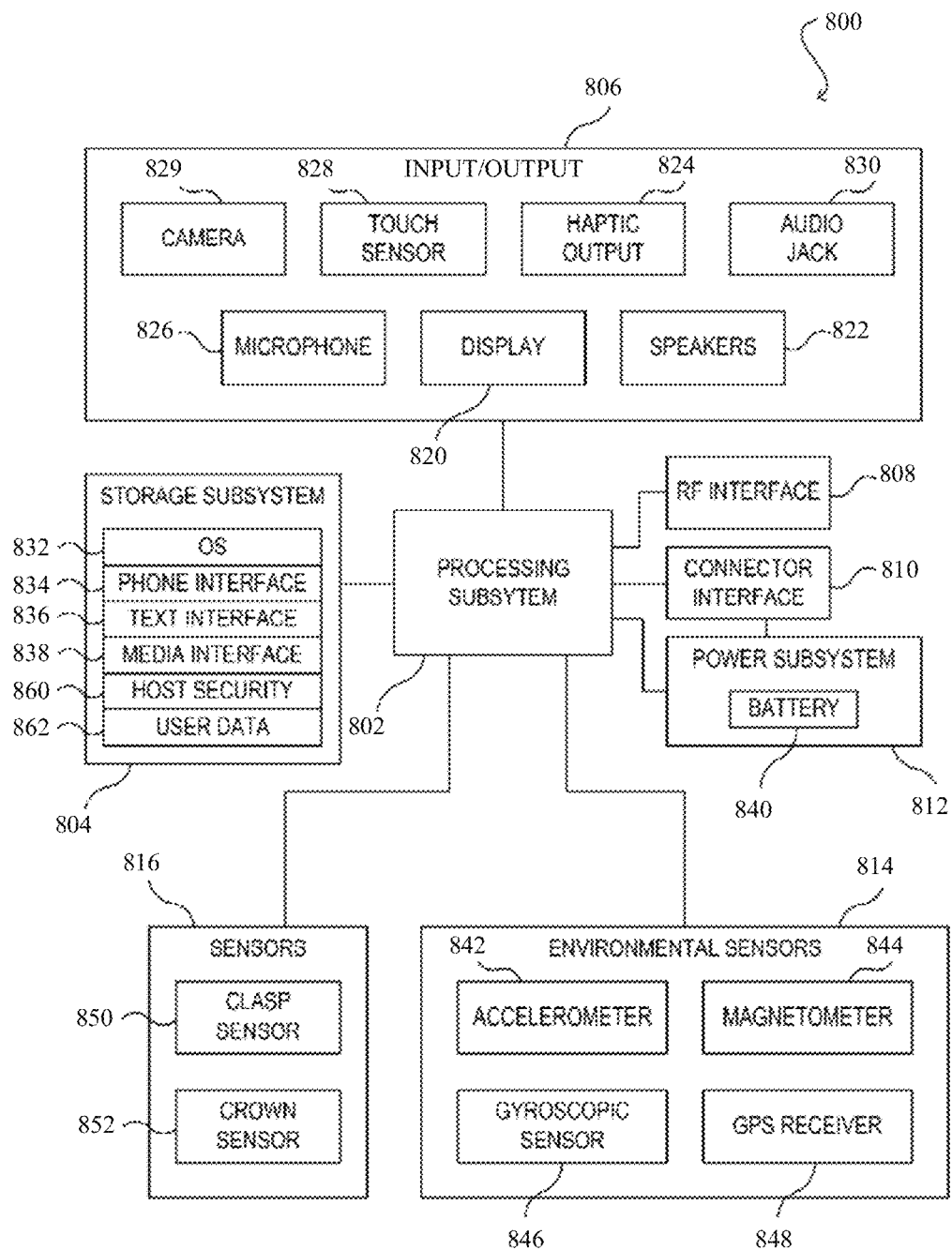
FIG. 8 is an example block diagram of a device (e.g., a wearable device) with which one or more implementations of the subject technology may be implemented.

FIG. 8 is an example block diagram of a wearable device 800 (e.g., a smart watch) according to one or more implementations of the subject technology. The wearable device 800 can be, and/or can be a part of, the wearable electronic device 110 shown in FIG. 1. Wearable device 800 can include processing subsystem 802, storage subsystem 804, input/output 806, RF interface 808, connector interface 810, power subsystem 812, environmental sensors 814, and strap sensors 816. Wearable device 800 can also include other components (not explicitly shown).

In many implementations, the wearable device 800 may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

Storage subsystem 804 can be implemented, e.g., using magnetic storage media, flash memory, other semiconductor memory (e.g., DRAM, SRAM), or any other non-transitory storage medium, or a combination of media, and can include volatile and/or non-volatile media. In some implementations, storage subsystem 804 can store media items such as audio files, video files, image or artwork files; information about a user's contacts (names, addresses, phone numbers, etc.); information about a user's scheduled appointments and events; notes; and/or other types of information, examples of which are described below. In some implementations, storage subsystem 804 can also store one or more application programs to be executed by processing subsystem 802 (e.g., video game programs, personal information management programs, media playback programs, interface programs associated with particular host devices and/or host device functionalities, etc.).

Input/output 806 can include any combination of input and output devices. A user can operate input devices of input/output 806 to invoke the functionality of wearable device 800 and can view, hear, and/or otherwise experience output from wearable device 800 via output devices of input/output 806.

Examples of output devices include display 820, speakers 822, and haptic output generator 824. Display 820 can be implemented using compact display technologies, e.g., LCD (liquid crystal display), LED (light-emitting diode), OLED (organic light-emitting diode), or the like. In some implementations, display 820 can incorporate a flexible display element or curved-glass display element, allowing wearable device 800 to conform to a desired shape. One or more speakers 822 can be provided using small-form-factor speaker technologies, including any technology capable of converting electronic signals into audible sound waves. In some implementations, speakers 822 can be used to produce tones (e.g., beeping or ringing) and can but need not be capable of reproducing sounds such as speech or music with any particular degree of fidelity. Haptic output generator 824 can be, e.g., a device that converts electronic signals into vibrations; in some implementations, the vibrations can be strong enough to be felt by a user wearing wearable device 800 but not so strong as to produce distinct sounds.

Examples of input devices include microphone 826, touch sensor 828, and camera 829. Microphone 826 can include any device that converts sound waves into electronic signals. In some implementations, microphone 826 can be sufficiently sensitive to provide a representation of specific words spoken by a user; in other implementations, microphone 826 can be usable to provide indications of general ambient sound levels without necessarily providing a high-quality electronic representation of specific sounds.

Touch sensor 828 can include, e.g., a capacitive sensor array with the ability to localize contacts to a particular point or region on the surface of the sensor and in some instances, the ability to distinguish multiple simultaneous contacts. In some implementations, touch sensor 828 can be overlaid over display 820 to provide a touchscreen interface, and processing subsystem 802 can translate touch events (including taps and/or other gestures made with one or more contacts) into specific user inputs depending on what is currently displayed on display 820. In some implementations, touch sensor 828 can also determine a location of a touch on the cover glass. A touch sensor may be incorporated into or on the display stack in order to determine a location of a touch. The touch sensor may be self-capacitive in certain implementations, mutual-capacitive in others, or a combination thereof.

Camera 829 can include, e.g., a compact digital camera that includes an image sensor such as a CMOS sensor and optical components (e.g., lenses) arranged to focus an image onto the image sensor, along with control logic operable to use the imaging components to capture and store still and/or video images. Images can be stored, e.g., in storage subsystem 804 and/or transmitted by wearable device 800 to other devices for storage. Depending on implementation, the optical components can provide fixed focal distance or variable focal distance; in the latter case, autofocus can be provided. Zero, one, or more cameras can be provided, depending on implementation.

In some implementations, input/output 806 can provide output to and/or receive input from an auxiliary device such as a headset. For example, audio jack 830 can connect via an audio cable (e.g., a standard 2.5-mm or 3.5-mm audio cable) to an auxiliary device. Audio jack 830 can include input and/or output paths. Accordingly, audio jack 830 can provide audio to the auxiliary device and/or receive audio from the auxiliary device. In some implementations, a wireless connection interface can be used to communicate with an auxiliary device.

Processing subsystem 802 can be implemented as any electronic device capable of processing, receiving, or transmitting data or instructions. Processing subsystem 802 can include one or more integrated circuits. For example, processing subsystem 802 may include one or more of: one or more single-core or multi-core microprocessors or microcontrollers, a central processing unit (CPU), an application-specific integrated circuit (ASIC), a digital signal processor (DSP), or additional combinations of such devices. In operation, processing subsystem 802 can control the operation of wearable device 800. In various implementations, processing subsystem 802 can execute a variety of programs in response to program code and can maintain multiple concurrently executing programs or processes. At any given time, some or all of the program code to be executed can be resident in processing subsystem 802 and/or in storage media such as storage subsystem 804.

Through suitable programming, processing subsystem 802 can provide various functionality for wearable device 800. For example, in some implementations, processing subsystem 802 can execute an operating system (OS) 832 and various applications for interfacing with a host device, such as a phone-interface application 834, a text-interface application 836, and/or a media interface application 838.

In some implementations, processing subsystem 802 can also execute a host security process 860 that provides support for establishing and maintaining a verified communication session with a host device. User data 862 can include any information specific to a user, such as identification information, user-specified settings and preferences, customized information (e.g., contacts, predefined text messages), and any other user-related data or content.

RF (radio frequency) interface 808 can allow wearable device 800 to communicate wirelessly with various host devices. RF interface 808 can include RF transceiver components such as an antenna and supporting circuitry to enable data communication over a wireless medium, e.g., using Wi-Fi (IEEE 802.8 family standards), Bluetooth® (a family of standards promulgated by Bluetooth SIG, Inc.), or other protocols for wireless data communication. RF interface 808 can be implemented using a combination of hardware (e.g., driver circuits, antennas, modulators/demodulators, encoders/decoders, and other analog and/or digital signal processing circuits) and software components. In some implementations, RF interface 808 can provide near-field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into RF interface 808.

Connector interface 810 can allow wearable device 800 to communicate with various host devices via a wired communication path, e.g., using Universal Serial Bus (USB), universal asynchronous receiver/transmitter (UART), or other protocols for wired data communication. In some implementations, connector interface 810 can provide a power port, allowing wearable device 800 to receive power, e.g., to charge an internal battery. For example, connector interface 810 can include a connector such as a mini-USB connector or a custom connector, as well as supporting circuitry.

Environmental sensors 814 can include various electronic, mechanical, electromechanical, optical, or other devices that provide information related to external conditions around wearable device 800. Sensors 814 in some implementations can provide digital signals to processing subsystem 802, e.g., on a streaming basis or in response to polling by processing subsystem 802 as desired. Any type and combination of environmental sensors can be used; shown by way of example are accelerometer 842, a magnetometer 844, a gyroscope sensor 846, and a GPS receiver 848.

Sensors 816 can include various electronic, mechanical, electromechanical, optical, or other devices that provide information to wearable device 800, such as clasp sensor 850 that can detect when clasp members are engaged with each other or disengaged from each other. As another example, one or more crown sensors 852 can be disposed to detect input from a crown. Crown sensors 852 can also include motion sensors, accelerometers, pressure sensors (e.g., piezoelectric devices), or the like.

Power subsystem 812 can provide power and power management capabilities for wearable device 800. For example, power subsystem 812 can include a battery 840 (e.g., a rechargeable battery) and associated circuitry to distribute power from battery 840 to other components of wearable device 800 that require electrical power. In some implementations, power subsystem 812 can also include circuitry operable to charge battery 840, e.g., when connector interface 810 is connected to a power source. In some implementations, power subsystem 812 can include a "wireless" charger, such as an inductive charger, to charge battery 840 without relying on connector interface 810. An inductive charging base may transmit power to an inductive receiver within the device in order to charge a battery of the device.

It will be appreciated that wearable device 800 is illustrative and that variations and modifications are possible.

Figure 9:
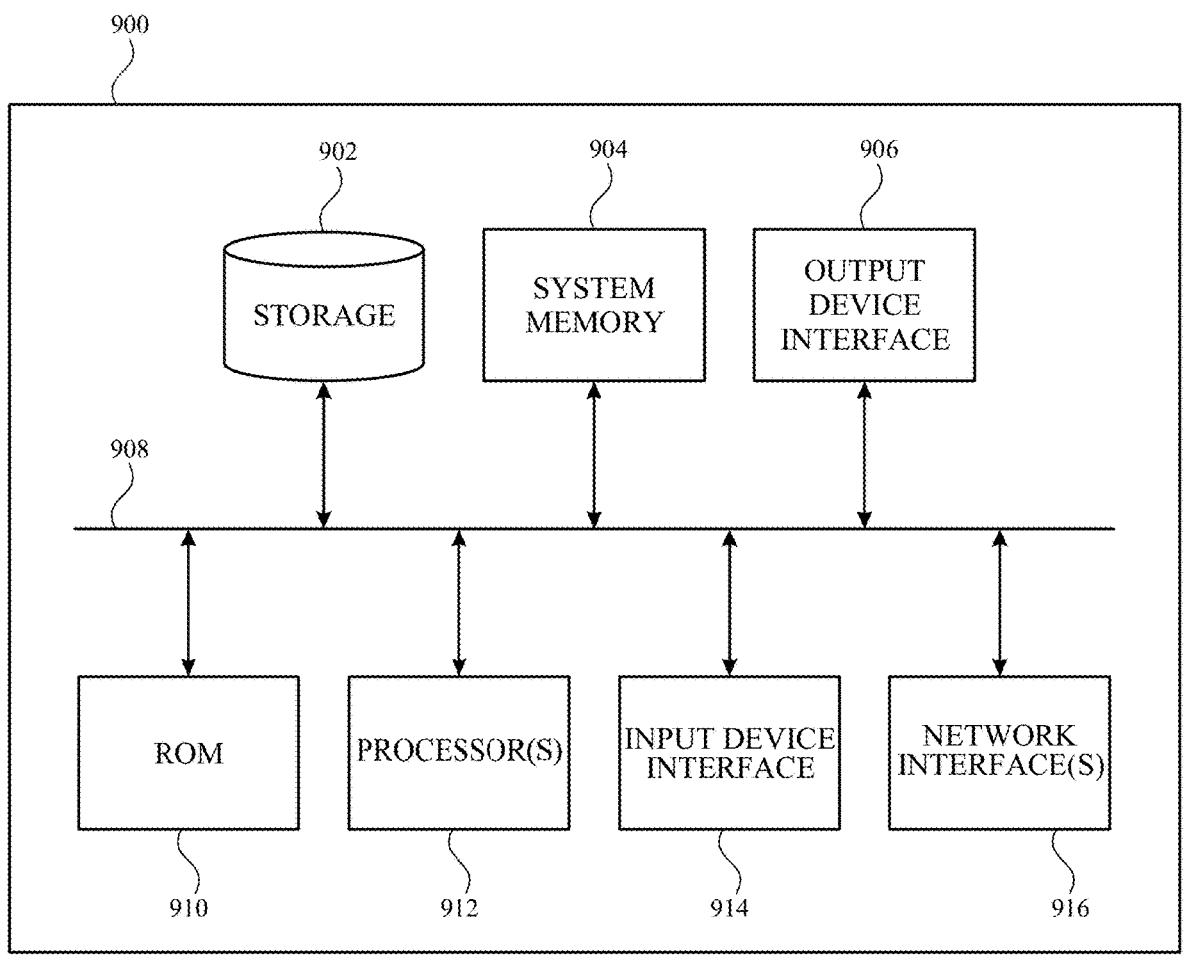
FIG. 9 illustrates an electronic system with which one or more implementations of the subject technology may be implemented.

FIG. 9 illustrates an electronic system 900 with which one or more implementations of the subject technology may be implemented. The electronic system 900 can be, and/or can be a part of, the electronic device 102, and/or the server 120 shown in FIG. 1. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more network nodes, such as the electronic device 102 shown in FIG. 1, through the one or more network interface (s) 916. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
   a memory configured to store a data source, the data source being local to the device;
   at least one processor configured to:
      receive data from the data source;
      receive a set of signals describing a current environment of a user;
      receive relevance information from the data source;
      provide, using a machine learning model, a relevance score for each of multiple data items based at least in part on a relevance metric determined for each of the multiple data items by applying the set of signals to the received relevance information;
      sort the multiple data items based at least in part on the relevance scores; and
      provide, as output, one or more of the sorted multiple data items.

2. The device of claim 1, wherein each relevance score comprises a linear combination based on the set of signals and a set of constants assigned to the set of signals.

3. The device of claim 1, wherein the set of signals include a signal based on a location or time.

4. The device of claim 1, wherein the set of signals and the relevance information are generated locally at the device.

5. The device of claim 1, wherein the memory is further configured to store the machine learning model.

6. The device of claim 1, wherein the at least one processor is further configured to provide, using the machine learning model, the relevance score locally without facilitation from a server.

7. The device of claim 1, wherein the at least one processor is further configured to provide, using the machine learning model, an updated relevance score by:
   generating a first Gaussian curve based on an affinity value and variance value corresponding to a data item;
   determining a standard deviation value of the first Gaussian curve;
   generating a second Gaussian curve based on shifting the first Gaussian curve by the standard deviation value; and
   applying the second Gaussian curve to the relevance score to provide the updated relevance score.

8. The device of claim 1, wherein the set of signals includes a current time, wherein the received relevance information for at least one of the multiple data items indicates a relevance of the at least one of the multiple data items as a function of time, and wherein applying the set of signals to the received relevance information comprises determining a current relevance of the at least one of the data items at the current time by obtaining a result of the function at the current time.

9. The device of claim 1, wherein the set of signals includes a current location of the device, wherein the relevance information for at least one of the multiple data items indicates a relevance of the at least one of the multiple data items as a function of a distance from a specific location, and wherein applying the set of signals to the received relevance information comprises determining a current relevance of the at least one of the data items while the device is at the current location by obtaining a result of providing the current location to the function of the distance.

10. The device of claim 1, wherein the device comprises a wearable electronic device, and the output of each of the one or more of the sorted multiple data items includes a graphical element.

11. The device of claim 1, wherein the at least one processor is further configured to:
provide an indication of an appropriate placement of each of the multiple data items for each of multiple different output environments, the different output environments including a virtual reality environment or an augmented reality environment.

12. A method of operating a computing device, the method comprising:
receiving data from a data source that is local to the computing device;
receiving a set of signals describing a current environment of a user;
receiving relevance information from the data source;
providing, using a machine learning model at the computing device, a relevance score for each of multiple data items based at least in part on a relevance metric determined for each of the multiple data items by applying the set of signals to the received relevance information;
sorting the multiple data items based at least in part on the relevance scores; and
providing, as output with the computing device, one or more of the sorted multiple data items.

13. The method of claim 12, wherein each relevance score comprises a linear combination based on the set of signals and a set of constants assigned to the set of signals.

14. The method of claim 12, wherein the set of signals include a signal based on a location or time.

15. The method of claim 12, wherein the set of signals and the relevance information are generated locally at the computing device, and wherein the set of signals further describe historical user behavior information.

16. The method of claim 12, further comprising:
providing, using the machine learning model, the relevance score locally without facilitation from a server.

17. The method of claim 12, further comprising:
providing, using the machine learning model, an updated relevance score by:
generating a first Gaussian curve based on an affinity value and variance value corresponding to a data item;
determining a standard deviation value of the first Gaussian curve;
generating a second Gaussian curve based on shifting the first Gaussian curve by the standard deviation value; and
applying the second Gaussian curve to the relevance score to provide the updated relevance score.

18. The method of claim 12, further comprising:
obtaining a confidence corresponding to at least one of the multiple data items; and
reducing the relevance score for the at least one of the multiple data items based on the confidence.

19. The method of claim 18, further comprising, after reducing the relevance score for the at least one of the multiple data items, increasing the relevance score for the at least one of the multiple data items by decreasing the reducing of the relevance score over time.

20. A computer program product comprising code stored in a non-transitory computer-readable storage medium, the code comprising:
code to receive data from a local data source;
code to receive a set of signals describing a current environment of a user;
code to receive relevance information from the local data source;
code to provide, using a machine learning model, a relevance score for each of multiple data items based at least in part on a relevance metric determined for each of the multiple data items by applying the set of signals to the received relevance information;
code to sort the multiple data items based at least in part on the relevance scores; and
code to provide, as output, one or more of the sorted multiple data items.

* * * * *